Oct. 21, 1952  G. A. CORMIER  2,614,580
UNLOADING VALVE
Filed July 17, 1947

INVENTOR.
Gerard A. Cormier.
BY Wm O. Morser
Att'y.

Patented Oct. 21, 1952

2,614,580

UNITED STATES PATENT OFFICE 2,614,580

UNLOADING VALVE

Gerard A. Cormier, Springfield, Vt., assignor to Jones & Lamson Machine Company, Springfield, Vt., a corporation of Vermont Application July 17, 1947, Serial No. 761,599

5 Claims. (Cl. 137—474)

The present invention relates to a pressure regulating valve and relates more particularly to an unloading valve for use in hydraulic systems.

In many hydraulic applications it is necessary to maintain working pressure within predetermined limits. In combination with an accumulator a pump may be used to supply oil or other fluid at a substantially constant pressure to a suitable pressure utilizing system. As is well known, the pump may be connected to the system including an accumulator, when needed, and when the pressure attains a predetermined value the pump may be relieved directly to the supply tank or low pressure port. Meanwhile the accumulator supplies the needed pressure until such pressure falls to a predetermined low value, at which time the pump may be reconnected to the system. In a valve to automatically accomplish the above, it is desirable that the difference between the high and low pressures at which the valve operates be readily adjustable. It is also desirable that the absolute value of the maximum and minimum points be independently adjustable. Heretofore valves have been proposed in which one or more of these variables has been permanently determined for a given valve by the diameter of a bore, a differential in the diameters of passageways, or the like.

It is, therefore, an object of the present invention to provide an unloading valve which is easily adjustable to provide a desired range of working pressure.

A further object of this invention is to provide a valve in which the minimum setting and maximum setting at which the valve operates may be independently adjusted.

Figure 1:
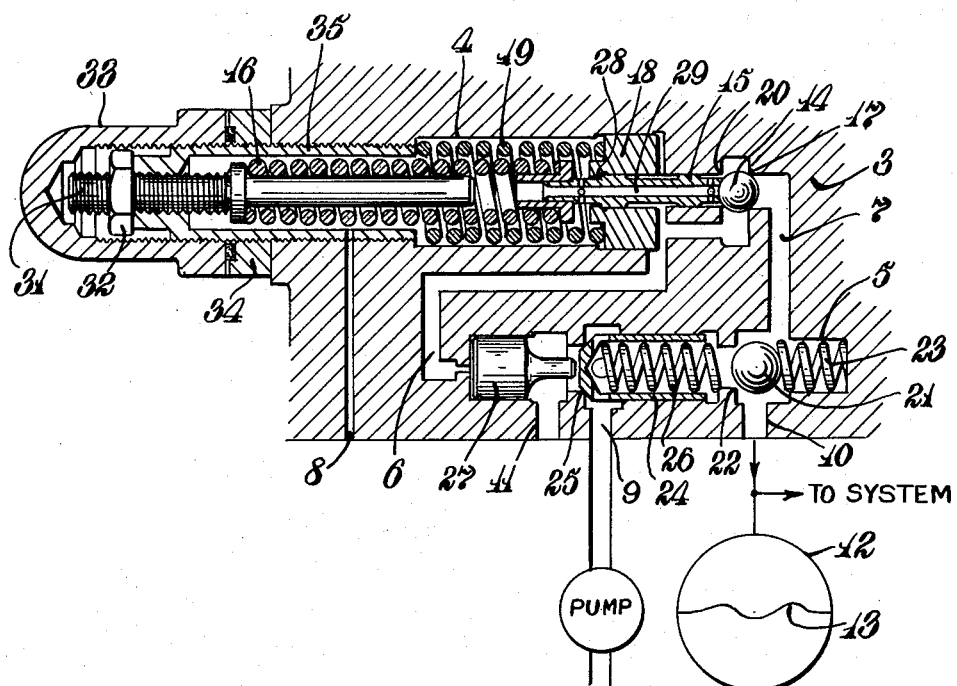
Figure 2:
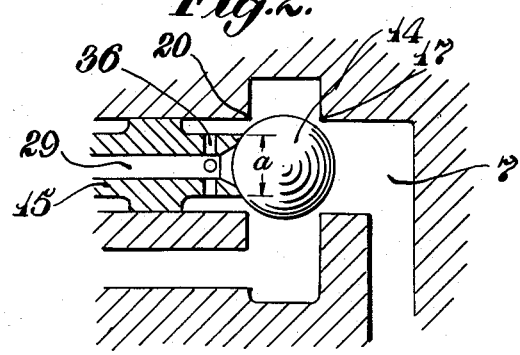

These and other objects and advantages of the present invention will become readily apparent from the following detailed specification, read in connection with the accompanying drawing wherein like reference numerals denote like elements, and in which Fig. 1 is a schematic representation of the valve illustrating the operating elements; and Fig. 2 is a detail of a portion of Fig. 1 showing the double acting ball valve.

Referring more particularly to Fig. 1, a valve body 3 is provided having two main bores 4 and 5 with interconnecting passageways 6 and 7. There are also provided three ports, a drain 8, a high pressure supply port 9, a port 10 leading to a pressure utilizing system, and a low pressure return port 11 leading to a supply tank not shown.

The hydraulic system may include an accumulator 12 having a diaphragm 13. When charged by a pump, the accumulator provides a steady supply of pressure to the hydraulic system in a well-known manner.

A valve assembly arranged in the bore 4 comprises a ball 14 seated on a stem 15 which is movable axially and is urged to the right, thus holding the ball 14 against ball seat 17 by a minimum pressure spring 16. Coaxial with stem 15 and independently slidable thereon, is piston member 18 which is urged to the right by differential spring 19. A ball seat 20, having the same diameter as the seat 17, limits the movement of the ball 14 to the left as will hereinafter be explained.

A check valve in the bore 5 comprises a ball 21 normally urged against ball seat 22 by spring 23. Also contained in bore 5 is a valve 24 urged against seat 25 by a spring 26. At the left end of bore 5 is a valve unloading member 27 adapted to actuate the valve 24 as will be explained.

In operation with the elements positioned as shown in Fig. 1, fluid under high pressure from a suitable pump is supplied through port 9 and the check valve comprising ball 21 and spring 23 to the system and the accumulator 12. The pressure thus developed in accumulator 12 is also built up against ball 14 through interconnecting passageway 7. It can be seen that the movement of ball 14 to the left is resisted by the combined pressures of spring 16 and spring 19 as a portion of piston 18 engages a shoulder 28 on the stem 15.

When the pressure in the accumulator 12 has risen to a predetermined maximum value which just exceeds the combined pressures of springs 16 and 19, the ball 14 will move to the left and leave ball seat 17. The instant that this happens, this pressure will appear in passageway 6 and will be applied to piston member 18 and to the valve unloading member 27. Due to the relatively large area of the piston 18, it will move forcibly to the left; thus removing the pressure of spring 19 from the sleeve 15 and the ball 14. The only pressure remaining to urge ball 14 to the right is the pressure of spring 16, and therefore it completes its travel to the left and becomes seated on ball seat 20. The pressure in passageway 6 will also force valve unloading member 27 to the right. This action will move the valve 24 to the right, compressing spring 26 and opening the pump port 9 to the low pressure port return 11. Ball 21 will be forced to the left onto the valve seat 22, thus preventing the accumulator pressure from being dissipated through the low pressure return port 11.

While the accumulator pressure is supplying the needs of the system, the pump is relieved directly to the return port as explained.

Upon reaching a predetermined minimum pressure, determined by the setting of the spring 16, the accumulator pressure will no longer be able to hold ball 14 to the left against ball seat 20. Spring pressure from spring 16 will move the ball 14 back onto the ball seat 17. When this occurs, the pressure in passageway 6 and the pressure against piston 18 will be relieved through apertures 36 and passageway 29 in the sleeve 15 to the drain port 8 which may lead back to a suitable reservoir. This will permit spring 19 to return the piston member 18 to the right so that both springs 19 and 16 once again urge ball 14 to the right against ball seat 17. The spring 26, similarly, will move the valve 24 and the member 27 to the left; thus interrupting the connection between pump port 9 and return port 11. The pump is now connected to replenish the supply of pressure to the system and to the accumulator 12.

It can be seen that the total pressure of springs 16 and 19 will determine the maximum pressure at which the pump will be unloaded or disconnected from the system. It will also be appreciated that the pressure of spring 19 will determine the differential between the maximum pressure at which the pump will be relieved, and the minimum pressure at which the pump will be reconnected to the system.

It is essential in the operation of the valve as described that ball 14 be out of hydraulic balance at all times in order to insure positive action. In Fig. 2 an enlarged view of this part of the assembly is shown with the ball 14 just leaving the ball seat 17. It can be seen that the pressure on the ball urging it to the left exceeds the pressure urging it to the right because of area (a) upon which the pressure is ineffective because of the stem 15. This precludes the possibility of the stem 15 leaving the ball to float between the ball seats 20 and 17.

The valve actuating member 27 must have a larger effective area presented to the pressure appearing in passageway 6 than the effective area at the valve seat 25. Thus with the same pressure in passageway 6 as appears in port 9, the member 27 will be able to force the valve 24 to the right and, in addition, overcome the force of the spring 26.

Independent adjustment of the springs 16 and 19 may be provided for as shown in Fig. 1. A tubular member 35 threadably engages valve body 3 and provides a stop for the differential spring 19. Upon removal of the acorn nut 33 and lock nut 34, it can be seen that adjustment of member 35 can be made to provide the degree of pressure desired against the piston member 18. This setting will determine the differential in pressure between the minimum and maximum values and may then be secured by lock nut 34. The setting of the spring 16 may then be accomplished by adjustment of the screw 31. This setting puts the desired spring pressure against the stem 15 and determines the minimum pressure at which the pump will be reconnected to the accumulator and hydraulic system. The setting of screw 31 may be secured by a lock nut 32. The entire assembly is then sealed by the acorn nut 33.

From the above detailed description, it is apparent that I have provided a novel type of unloading valve in which the minimum and maximum pressures at which it operates can be independently selected to suit any particularly hydraulic application.

While a preferred embodiment of this invention has been described, it is understood that modifications within the spirit and scope of the invention may occur to persons skilled in the art.

I claim:

1. A fluid controlling valve comprising a valve casing having a bore therein, a first annular valve seat in one end of said bore, a second annular valve seat in said bore opposite said first valve seat, a ball between said valve seats and alternately engageable therewith, a hollow stem extending axially of the bore and engaging said ball, first spring means urging said stem against said ball to seat the latter against said first valve seat, second spring means normally urging said stem against said ball to seat the latter against said first valve seat, and a passageway communicating between said first valve seat and the chamber in which said first spring means and said second spring means are located when said ball leaves said first valve seat.

2. A valve for controlling a source of fluid pressure comprising a valve casing having a bore therein, a first annular valve seat at which said pressure is applied in one end of said bore, a second annular valve seat in said bore opposite said first valve seat, a ball between said valve seats and alternately engageable therewith, a hollow stem extending axially of the bore and engaging said ball, first spring means urging said stem against said ball to seat the latter on said first valve seat against said pressure, second spring means normally urging said stem against said ball to seat the latter on said first valve seat, and a passageway communicating between said source and the chamber in which said second spring means is located when said ball leaves said first valve seat whereby pressure of said second spring means on said stem is relieved.

3. A device for the regulation of fluid pressure, comprising a valve adapted to open under the influence of a predetermined pressure, first resilient means urging said valve to its closed position, a piston member abutting said valve, second resilient means normally urging said piston member against said valve to close said valve, and a passageway connecting said pressure with said piston member when said valve is in the open position, whereby all force of said second resilient means on said valve is removed.

4. A device for alternately connecting a source of fluid under pressure to a pressure utilizing system and to a relief port in response to changes in the pressure in said system, comprising a valve adapted to open under the influence of pressure, first adjustable spring means urging said valve to its closed position against said pressure, a piston member abutting said valve, second adjustable spring means normally urging said piston member against said valve to close said valve, and a passageway connecting said pressure with said piston member when said valve is in the open position, during which time all force of said second spring means on said valve is removed.

5. A device for the regulation of fluid pressure, comprising a valve casing having a bore therein, an annular valve seat in one end of said bore, a ball adapted to engage said valve seat, a stem extending axially of said bore and engaging said ball, first spring means urging said stem against said ball to seat the latter on said valve seat, a piston member slidably mounted on said stem, second spring means normally urging said piston against an abutment on said stem to urge said ball against said valve seat, and a passageway connecting said piston member to said pressure whenever said ball leaves said valve seat, whereby all force of said second spring means is removed from said ball and stem by said pressure.

GERARD A. CORMIER.

REFERENCES CITED

The following references are of record in the file of this patent:

UNITED STATES PATENTS

| Number | Name | Date |
| --- | --- | --- |
| 1,912,773 | Hufford | June 6, 1933 |
| 2,280,937 | Thornhill | Apr. 28, 1942 |
| 2,372,016 | Rockwell | Mar. 20, 1945 |
| 2,379,712 | Hildebrecht | July 3, 1945 |
| 2,397,117 | Ashton | Mar. 26, 1946 |
| 2,437,480 | Pugh | Mar. 9, 1948 |
| 2,484,628 | Le Valley | Oct. 11, 1949 |